United States Patent
Yan et al.

(10) Patent No.: US 11,283,631 B2
(45) Date of Patent: Mar. 22, 2022

(54) APPARATUS, METHOD AND COMPUTER PROGRAM PRODUCT FOR AUTHENTICATION

(71) Applicant: Nokia Technologies Oy, Espoo (FI)

(72) Inventors: Zheng Yan, Shaanxi (CN); Sihui Zhao, Shaanxi (CN)

(73) Assignee: Nokia Technologies Oy, Espoo (FI)

( * ) Notice: Subject to any disclaimer, the term of this patent is extended or adjusted under 35 U.S.C. 154(b) by 302 days.

(21) Appl. No.: 16/472,812

(22) PCT Filed: Jan. 3, 2017

(86) PCT No.: PCT/CN2017/000045
§ 371 (c)(1),
(2) Date: Jun. 21, 2019

(87) PCT Pub. No.: WO2018/126338
PCT Pub. Date: Jul. 12, 2018

(65) Prior Publication Data
US 2019/0372970 A1 Dec. 5, 2019

(51) Int. Cl.
*G06F 21/00* (2013.01)
*H04L 9/32* (2006.01)
(Continued)

(52) U.S. Cl.
CPC ............ *H04L 9/3271* (2013.01); *G10L 17/04* (2013.01); *G10L 17/24* (2013.01);
(Continued)

(58) Field of Classification Search
CPC ............... H04L 9/3271; H04L 63/0861; H04L 63/0884; H04L 63/18; H04L 9/3231;
(Continued)

(56) References Cited

U.S. PATENT DOCUMENTS 9,042,867 B2 5/2015 Gomar
2008/0281600 A1* 11/2008 Kuppuswamy ......... G10L 17/22
704/273
(Continued)

FOREIGN PATENT DOCUMENTS

CN 1808567 A 6/2006
CN 101365193 A 2/2009
(Continued)

OTHER PUBLICATIONS

Meng et al., "Surveying the Development of Biometric User Authentication on Mobile Phones", IEEE Communications Surveys & Tutorials, vol. 17, No. 3, 2015, pp. 1268-1293.
(Continued)

*Primary Examiner* — Jeffrey C Pwu
*Assistant Examiner* — William A Corum, Jr.
(74) *Attorney, Agent, or Firm* — Fay Sharpe LLP (57) ABSTRACT

Methods, apparatus, computer program product and computer readable medium are disclosed for authentication. A method comprises: sending an authentication request to a relying party, wherein the authentication request comprises a voice authentication command of a user; receiving from an identity provider at least one first challenge message with respective randomly generated verification code and respective first randomly generated challenge style; and sending at least one voice verification code to the identity provider, wherein the at least one voice verification code is pronounced by the user in the light of the respective randomly generated verification code and the respective first randomly generated challenge style.

18 Claims, 6 Drawing Sheets

(51) Int. Cl.
*G10L 17/04* (2013.01)
*G10L 17/24* (2013.01)
*H04L 29/06* (2006.01)
*H04W 12/062* (2021.01)
*H04W 12/065* (2021.01)
*H04W 12/122* (2021.01)

(52) U.S. Cl.
CPC ...... *H04L 63/0861* (2013.01); *H04L 63/0884* (2013.01); *H04L 63/18* (2013.01); *H04W 12/062* (2021.01); *H04W 12/065* (2021.01); *H04W 12/122* (2021.01); *H04L 9/3231* (2013.01)

(58) Field of Classification Search
CPC ............ H04L 63/0892; H04W 12/062; H04W 12/065; H04W 12/122; G10L 17/04; G10L 17/24
See application file for complete search history.

(56) References Cited

U.S. PATENT DOCUMENTS

| | | | |
|---|---|---|---|
| 2010/0131273 | A1 | 5/2010 | Mey-Raz et al. |
| 2012/0130714 | A1* | 5/2012 | Zeljkovic ............... G10L 17/04 704/235 |
| 2013/0097682 | A1* | 4/2013 | Zeljkovic ............ H04L 9/3231 726/7 |
| 2013/0132091 | A1 | 5/2013 | Skerpac |
| 2013/0262873 | A1* | 10/2013 | Read ..................... H04W 12/06 713/186 |
| 2014/0172430 | A1* | 6/2014 | Rutherford ............ G06Q 20/32 704/273 |
| 2014/0222428 | A1 | 8/2014 | Cumani et al. |
| 2014/0359736 | A1 | 12/2014 | Harty et al. |
| 2017/0351848 | A1 | 12/2017 | Bakish |
| 2018/0151182 | A1* | 5/2018 | Wyss ...................... G10L 17/06 |
| 2018/0232511 | A1* | 8/2018 | Bakish ................ G10L 21/0324 |
| 2018/0294965 | A1* | 10/2018 | Yan ......................... G10L 17/00 |

FOREIGN PATENT DOCUMENTS

| | | |
|---|---|---|
| CN | 103685185 A | 3/2014 |
| CN | 103731271 A | 4/2014 |
| CN | 104036780 A | 9/2014 |
| CN | 104217149 A | 12/2014 |
| CN | 104660416 A | 5/2015 |
| CN | 105873050 A | 8/2016 |
| CN | 105933272 A | 9/2016 |
| CN | 106098068 A | 11/2016 |
| EP | 2605567 A1 | 6/2013 |
| IN | 3294CH2015 A | 7/2015 |
| WO | 2011/139689 A1 | 11/2011 |
| WO | WO 2010/066269 A1 | 6/2017 |

OTHER PUBLICATIONS

Blasco et al., "A Survey of Wearable Biometric Recognition Systems", ACM Computing Surveys (CSUR), vol. 49, No. 3, Sep. 2016, 35 pages.
Hosur et al., "A Cryptographic Approach to Prevent a Spoof Attack for Secure Information Retrieval in a Biometric System", World Congress on Information and Communication Technologies, Oct. 30-Nov. 2, 2012, pp. 326-331.
Pavesic et al., "A Multimodal Hand-Based Verification System with an Aliveness-Detection Module", Annales Des Telecommunications, vol. 62, No. 1-2, Jan. 2007, pp. 130-155.
Pishva et al., "Spectroscopic Approach for Aliveness Detection in Biometrics Authentication", 41st Annual IEEE International Carnahan Conference on Security Technology, Oct. 8-11, 2007, pp. 133-137.
Jadhav et al., "Implementation of an Embedded Hardware of FVRS on FPGA", International Conference on Information Processing (ICIP), Dec. 16-19, 2015, pp. 48-53.
Baldisserra et al., "Fake Fingerprint Detection by Odor Analysis", International Conference on Biometrics, 2006, pp. 265-272.
Ferrer et al., "An Approach to SWIR Hyperspectral Hand Biometrics", Information Sciences, vol. 268, Jun. 1, 2014, pp. 3-19.
Keshishzadeh et al., "Single Lead Electrocardiogram Feature Extraction for the Human Verification", 5th International Conference on Computer and Knowledge Engineering (ICCKE), Oct. 29, 2015, pp. 118-122.
Czajka et al., "Iris Recognition With Match-on-Card", 15th European Signal Processing Conference, Sep. 3-7, 2007, pp. 189-192.
Pacut et al., "Aliveness Detection for IRIS Biometrics", Proceedings 40th Annual 2006 International Carnahan Conference on Security Technology, Oct. 16-19, 2006, pp. 122-129.
Rigas et al., "Eye Movement-Driven Defense Against Iris Print-Attacks", Pattern Recognition Letters, vol. 68, Part 2, Dec. 15, 2015, 10 pages.
Bodade et al., "Dynamic Iris Localisation: A Novel Approach Suitable for Fake Iris Detection", International Conference on Ultra Modern Telecommunications & Workshops, Oct. 12-14, 2009, 5 pages.
Silva et al., "Harnessing the Power of Biosignals", Computer, vol. 47, No. 3, Mar. 2014, pp. 74-77.
Carreiras et al., "ECG Signals for Biometric Applications—are we there yet?", 11th International Conference on Informatics in Control, Automation and Robotics (ICINCO), Sep. 1-3, 2014, 8 pages.
Kumagai et al., "Detection of Inconsistency Between Subject and Speaker Based on the Co-occurrence of Lip Motion and Voice Towards Speech Scene Extraction from News Videos", IEEE International Symposium on Multimedia, Dec. 5-7, 2011, pp. 311-318.
Sallam et al., "Correlation Based Speech-Video Synchronization", Pattern Recognition Letters, vol. 32, No. 6, Apr. 15, 2011, pp. 780-786.
Zhu et al., "Liveness Detection Using Time Drift Between Lip Movement and Voice", International Conference on Machine Learning and Cybernetics, Jul. 14-17, 2013, pp. 973-978.
Daugman, "Demodulation by Complex-Valued Wavelets for Stochastic Pattern Recognition", International Journal of Wavelets, Multiresolution and Information Processing, vol. 1, No. 1, 2003, pp. 1-17.
Hachkar et al., "A Comparison of DHMM and DTW for Isolated Digits Recognition System of Arabic Language", International Journal on Computer Science and Engineering (IJCSE), vol. 3, No. 3, Mar. 2011, pp. 1002-1008.
Wang et al., "Stress Detection Based on Multi-class Probabilistic Support Vector Machines for Accented English Speech", WRI World Congress on Computer Science and Information Engineering, Mar. 31-Apr. 2, 2009, pp. 346-350.
"Nuance VocalPassword™:: Liveness Detection using Voice Biometrics (Intra-session voice variation)—Overview", Nuance, Retrieved on Jun. 19, 2019, Webpage available at : http://www.nuance.it/ucmprod/groups/enterprise/@web-enus/documents/collateral/nc_015226.pdf.
International Search Report and Written Opinion received for corresponding Patent Cooperation Treaty Application No. PCT/CN2017/000045, dated Sep. 30, 2017, 11 pages.

* cited by examiner

APPARATUS, METHOD AND COMPUTER PROGRAM PRODUCT FOR AUTHENTICATION

RELATED APPLICATION

This application was originally filed as Patent Cooperation Treaty Application No. PCT/CN2017/000045 on Jan. 3, 2017.

FIELD OF THE INVENTION

Embodiments of the disclosure generally relate to data processing, and more particularly, to technologies for authentication.

BACKGROUND

Biometric-based identity recognition is becoming more and more popular with the rapid development of information and computing technology. Compared with traditional identity authentication methods, the biometric authentication technology is based on "who you are" rather than "what you have" (such as an identity (ID) card) or "what you know" (such as a password). It has the features of not being lost, stolen or forgotten. Despite many advantages, biometric-based identity recognition systems, like any other security applications, are also encountering a range of attacks. Spoofing attack is one of the attacks and it has great practical relevance because it doesn't require advanced technical skills. Intruders can easily get or replicate legitimate user's biometric characteristics and use them to pass through authentication and access the biometric systems. Thus, an improved authentication solution is desirable.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

According to one aspect of the disclosure, it is provided a method for authentication. Said method may comprise: sending an authentication request to a relying party, wherein the authentication request comprises a voice authentication command of a user; receiving from an identity provider at least one first challenge message with respective randomly generated verification code and respective first randomly generated challenge style; and sending at least one voice verification code to the identity provider, wherein the at least one voice verification code is pronounced by the user in the light of the respective randomly generated verification code and the respective first randomly generated challenge style.

According to another aspect of the present disclosure, it is provided an apparatus comprising means configured to send an authentication request to a relying party, wherein the authentication request comprises a voice authentication command of a user; means configured to receive from an identity provider at least one first challenge message with respective randomly generated verification code and respective first randomly generated challenge style; and means configured to send at least one voice verification code to the identity provider, wherein the at least one voice verification code is pronounced by the user in the light of the respective randomly generated verification code and the respective first randomly generated challenge style.

According to another aspect of the present disclosure, it is provided a computer program product embodied on a distribution medium readable by a computer and comprising program instructions which, when loaded into a computer, execute the following: send an authentication request to a relying party, wherein the authentication request comprises a voice authentication command of a user; receive from an identity provider at least one first challenge message with respective randomly generated verification code and respective first randomly generated challenge style; and send at least one voice verification code to the identity provider, wherein the at least one voice verification code is pronounced by the user in the light of the respective randomly generated verification code and the respective first randomly generated challenge style.

According to another aspect of the present disclosure, it is provided a non-transitory computer readable medium having encoded thereon statements and instructions to cause a processor to execute the following: send an authentication request to a relying party, wherein the authentication request comprises a voice authentication command of a user; receive from an identity provider at least one first challenge message with respective randomly generated verification code and respective first randomly generated challenge style; and send at least one voice verification code to the identity provider, wherein the at least one voice verification code is pronounced by the user in the light of the respective randomly generated verification code and the respective first randomly generated challenge style.

According to another aspect of the present disclosure, it is provided an apparatus for authentication. Said apparatus may comprise a sending element configured to send an authentication request to a relying party, wherein the authentication request comprises a voice authentication command of a user; a receiving element configured to receive from an identity provider at least one first challenge message with respective randomly generated verification code and respective first randomly generated challenge style; and the sending element further configured to send at least one voice verification code to the identity provider, wherein the at least one voice verification code is pronounced by the user in the light of the respective randomly generated verification code and the respective first randomly generated challenge style.

According to another aspect of the disclosure, it is provided a method for authentication. Said method may comprise: receiving from a user agent an authentication request comprising a voice authentication command; forwarding the authentication request to an identity provider, wherein the forwarded authentication request further comprises an address of the user agent and a service identifier; and receiving an authentication result from the identity provider; performing one or more operations based on the authentication result.

According to another aspect of the present disclosure, it is provided an apparatus comprising means configured to receive from a user agent an authentication request comprising a voice authentication command; means configured to forward the authentication request to an identity provider, wherein the forwarded authentication request further comprises an address of the user agent and a service identifier; and means configured to receive an authentication result from the identity provider; means configured to perform one or more operations based on the authentication result.

According to another aspect of the present disclosure, it is provided a computer program product embodied on a distribution medium readable by a computer and comprising program instructions which, when loaded into a computer, execute the following: receive from a user agent an authentication request comprising a voice authentication command; forward the authentication request to an identity provider, wherein the forwarded authentication request further comprises an address of the user agent and a service identifier; and receive an authentication result from the identity provider; perform one or more operations based on the authentication result.

According to another aspect of the present disclosure, it is provided a non-transitory computer readable medium having encoded thereon statements and instructions to cause a processor to execute the following: receive from a user agent an authentication request comprising a voice authentication command; forward the authentication request to an identity provider, wherein the forwarded authentication request further comprises an address of the user agent and a service identifier; and receive an authentication result from the identity provider; perform one or more operations based on the authentication result.

According to another aspect of the present disclosure, it is provided an apparatus for authentication. Said apparatus may comprise a receiving element configured to receive from a user agent an authentication request comprising a voice authentication command; a forwarding element configured to forward the authentication request to an identity provider, wherein the forwarded authentication request further comprises an address of the user agent and a service identifier; and the receiving element further configured to receive an authentication result from the identity provider; a performing element configured to perform one or more operations based on the authentication result.

According to one aspect of the disclosure, it is provided a method for authentication. Said method may comprise: receiving an authentication request from a relying party, wherein the authentication request comprises a voice authentication command, an address of a user agent and a service identifier; locating a user's profile containing the voice patterns of the user based on the authentication request; sending to the user agent at least one first challenge message with respective randomly generated verification code and respective first randomly generated challenge style; and receiving from the user agent at least one voice verification code; checking the validity of the at least one voice verification code; calculating the liveness of the at least one voice verification code; generating an authentication result based on the validity and the liveness; and sending the authentication result.

According to another aspect of the present disclosure, it is provided an apparatus comprising means configured to receive an authentication request from a relying party, wherein the authentication request comprises a voice authentication command, an address of a user agent and a service identifier; means configured to locate a user's profile containing the voice patterns of the user based on the authentication request; means configured to send to the user agent at least one first challenge message with respective randomly generated verification code and respective first randomly generated challenge style; and means configured to receive from the user agent at least one voice verification code; means configured to check the validity of the at least one voice verification code; means configured to calculate the liveness of the at least one voice verification code; means configured to generate an authentication result based on the validity and the liveness; and means configured to send the authentication result.

According to another aspect of the present disclosure, it is provided a computer program product embodied on a distribution medium readable by a computer and comprising program instructions which, when loaded into a computer, execute the following: receive an authentication request from a relying party, wherein the authentication request comprises a voice authentication command, an address of a user agent and a service identifier; locate a user's profile containing the voice patterns of the user based on the authentication request; send to the user agent at least one first challenge message with respective randomly generated verification code and respective first randomly generated challenge style; and receive from the user agent at least one voice verification code; check the validity of the at least one voice verification code; calculate the liveness of the at least one voice verification code; generate an authentication result based on the validity and the liveness; and send the authentication result.

According to another aspect of the present disclosure, it is provided a non-transitory computer readable medium having encoded thereon statements and instructions to cause a processor to execute the following: receive an authentication request from a relying party, wherein the authentication request comprises a voice authentication command, an address of a user agent and a service identifier; locate a user's profile containing the voice patterns of the user based on the authentication request; send to the user agent at least one first challenge message with respective randomly generated verification code and respective first randomly generated challenge style; and receive from the user agent at least one voice verification code; check the validity of the at least one voice verification code; calculate the liveness of the at least one voice verification code; generate an authentication result based on the validity and the liveness; and send the authentication result.

According to another aspect of the present disclosure, it is provided an apparatus for authentication. Said apparatus may comprise a receiving element configured to receive an authentication request from a relying party, wherein the authentication request comprises a voice authentication command, an address of a user agent and a service identifier; a locating element configured to locate a user's profile containing the voice patterns of the user based on the authentication request; a sending element configured to send to the user agent at least one first challenge message with respective randomly generated verification code and respective first randomly generated challenge style; and the receiving element further configured to receive from the user agent at least one voice verification code; a checking element configured to check the validity of the at least one voice verification code; a calculating element configured to calculate the liveness of the at least one voice verification code; a generating element configured to generate an authentication result based on the validity and the liveness; and the sending element further configured to send the authentication result.

These and other objects, features and advantages of the disclosure will become apparent from the following detailed description of illustrative embodiments thereof, which is to be read in connection with the accompanying drawings.

DETAILED DESCRIPTION

For the purpose of explanation, details are set forth in the following description in order to provide a thorough understanding of the embodiments disclosed. It is apparent, however, to those skilled in the art that the embodiments may be implemented without these specific details or with an equivalent arrangement.

In principle, all the modules of an authentication system can be attacked: acquisition devices, feature extraction, and recognition modules, communication channels between different modules, and database storage. Generic potential attacks includes following aspects: 1) Faking a sensor; 2) Resubmitting biometric signals; 3) Overriding a feature extractor; 4) Tampering biometric features; 5) Compromising a matcher; 6) Tampering stored templates; 7) Attacking the channel between the stored templates and the matcher; 8) Overriding a final decision. In the authentication system based on biometric features especially physiological characteristics, the faking attacks and the resubmitting attacks are most easily approached and may be seriously considered. Liveness test is a solution to resist these attacks, which ensure the biometric cue presented is alive and from a right person. The replicating ones are usually unliveness. For example, photographs, videos or three dimension (3D) masks of the legitimate user are always used to attack a face recognition system. They may be as same as the real person apparently, but they cannot pass the check of liveness detection or answer the system challenge.

There are already some researches in the area of liveness detection in face recognition, fingerprint recognition and iris recognition. However, little literature studies the liveness detection in voiceprint recognition. Some references provide a method by inspecting the lips' dynamic. This method needs a camera in the system and asks the users to be aligned with the lens during the verification. So it is not convenient and usable for some application scenarios.

In existing liveness detection methods for biometric authentication, there are some problems. First, extra devices (such as the camera) that might be expensive or rarely used in daily life are needed in some existing methods. This might increase the detection cost and reduce the popularization of the methods. Second, the user experience of some methods is not good. Some methods take long time or cause discomfort to users. Third, the liveness detection methods for biometric system are mostly separately from the authentication that might weaken the security of the real systems.

The embodiments of the disclosure provide an authentication solution with liveness detection for voiceprint authentication that can be used without any additional equipment. It aims to resist the spoof attack effectively and improve the usability of the liveness detection for voice authentication. The solution includes the following main aspects: at a registration phase, a user registers at an identity provider (IdP) by providing a number of personal voices (following the challenges of the IdP) in order to train the IdP to remember his/her voice features. The user may also set his or her personal voice command (such as personal authentication command (PAC), etc.) for initiating a future authentication process. A relying party (RP) registers at the IdP with its offered services. The registered personal voice is protected in order to resist potential attacks, for example, it is encrypted using a key unknown to other distrusted parties or transmitted in a secure channel, thus the RP or other device has no way to know it. The IdP is trusted, thus can be applied to perform authentication, registration and other functionality. The IdP can be a trusted server for online service login or a trusted component inside a device/computer for user identification and recognition.

At a user authentication phase, a random generator is applied in the IdP to randomly generate at least one voice verification code and at least one corresponding challenge style. The challenge style may specify the speaking speed of challenged voice verification codes in sequence, the code intervals and the code speaking volume, as well as other features of a speaking style (e.g., pronunciation emphasis, pronunciation length of a voice code, etc.). The IdP challenges the user with a randomly generated voice code and a randomly generated challenge style. The challenged user should repeat the codes with the similar style in terms of spoken speed, volume, code intervals and pronunciation features in order to pass the verification and authentication. The IdP calculates the user's liveness based on the deviations between the challenging style and the response style of the challenged voice codes. A threshold may be set for accepted sum of deviations. The IdP matches the user voice input with saved patterns in order to authenticate the user. Only the user who passes the verification on both voiceprint recognition and liveness detection (for example, the liveness score is below a predefined threshold), the authentication is successful and the user can access the service provided by the RP or perform other operations such as registration update operation, registration deletion operation, etc.

Figure 1:
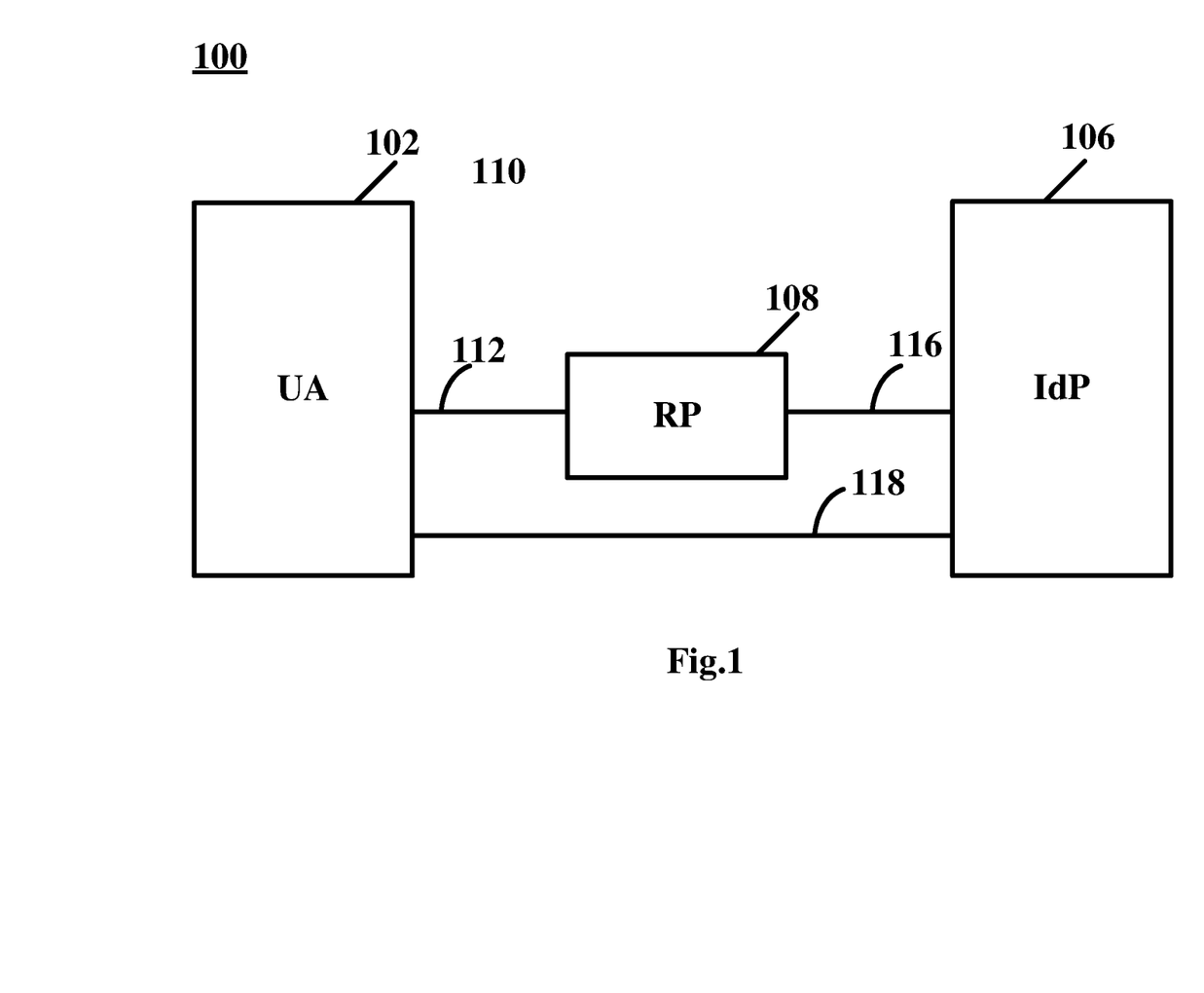
FIG. 1 depicts a schematic system, in which some embodiments of the present disclosure can be implemented.

FIG. 1 depicts a schematic system, in which some embodiments of the present disclosure can be implemented. As shown in FIG. 1, the system 100 comprises a user apparatus/agent (UA) 102 operably connected to a relying party (RP) 108 through a link 112, and connected to an identity provider (IdP) 106 through a link 118. The UA 102 can be implemented in form of hardware, software or their combination, including but not limited to, fixed terminal, mobile terminal, portable terminal, smart phone, desktop computer, cloud client, laptop computer, handset, station, unit, device, multimedia tablet, Internet/network node, communicator, Personal Digital Assistant (PDA), client software, or any combination thereof. The UA 102 may be used by a user to access the service(s) provided by the RP 108 if the user has been authenticated. For example, the user of the UA 102 can access the services by using any suitable applications installed in the UA 102. In general, the UA 102 can be equipped with one or more I/O devices, such as microphone, camera, handwriting board, touch screen, display etc., to input and/or output the user's bio-information or other information. Noted that the system 100 can include two or more UAs 102 though only one UA 102 is shown in FIG. 1.

The RP 108 may connect to the IdP 106 through a link 116. The RP 108 can be implemented in form of hardware, software or their combination, including but not limited to, fixed terminal, mobile terminal, portable terminal, smart phone, server, desktop computer, laptop computer, cloud computer, handset, station, unit, device, multimedia tablet, Internet/network node, communicator, Personal Digital Assistant (PDA), service software, or any combination thereof. The RP 108 may provide at least one service that can be accessed by the user of UA 102. For example, the services can be any kind of services including, but not limited to, social networking service such as LinkedIn, Facebook, Twitter, YouTube, messaging service such as WeChat, Yahoo! Mail, device management service and on-line shopping service such as Amazon, Alibaba, TaoBao etc. The RP 108 may register its service(s) at the IdP 106 as RP_id(s). In addition, the RP 108 may conclude the authentication with the support of the IdP 106. Noted that the system 100 can include two or more RPs 108 though only one RP 108 is shown in FIG. 1. Moreover, the RP 108 may be deployed as a cloud service.

The IdP 106 can be implemented in form of hardware, software or their combination, including but not limited to, server, desktop computer, laptop computer, cloud computer, Internet/network node, communicator, service software, or any combination thereof. In addition, the IdP 106 can manage and store information related to the UA 102 and RP 108, store the bio-information (such as voice information) of the user of UA 102, authenticate the user, and perform registration function, and/or other suitable functions. Moreover, the IdP 106 may be deployed as a cloud service.

As shown in FIG. 1, the links 112, 116 and 118 may be secure channels. For example, the security channels may be established between each two parties in the system 100 by applying a secure communication protocol, e.g., TLS, SSL, OpenSSL, HTTPs, etc.

Figure 2:
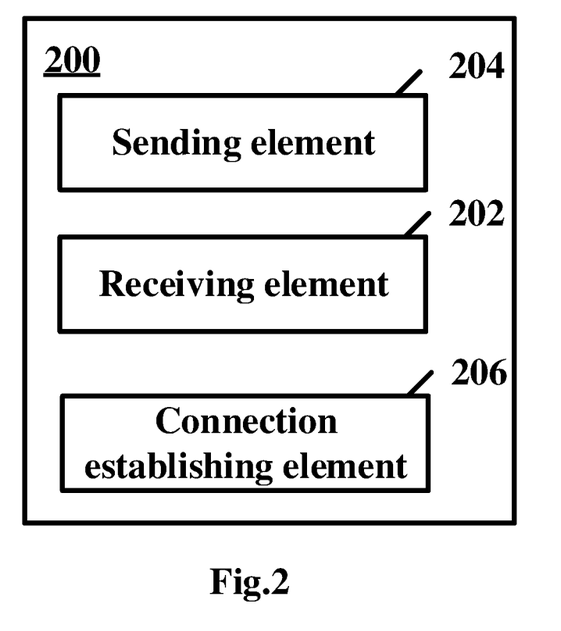
FIG. 2 shows a simplified block diagram of an apparatus for authentication in a system according to an embodiment of the present disclosure.

FIG. 2 shows a simplified block diagram of an apparatus 200 for authentication in a system according to an embodiment of the present disclosure. As described above, the system may comprise the components as described in FIG. 1. The apparatus 200 can be implemented as the UA 102 or a part of the UA 102 in FIG. 1. When a new user wishes to access a service provided by the RP 108, the user may first perform a registration procedure in the system 100, and when the user has successfully registered in the system 100, she/he may perform an authentication procedure to access the service if the authentication is successful or perform other operations. In the following, the operations performed by the apparatus 200 in the registration procedure will be described firstly, and then the operations performed by the apparatus 200 in the authentication procedure will be described.

With reference to FIG. 2 and FIG. 1, the apparatus 200 may include a sending element 202 configured to send a registration request to a relying party such as the RP 108. The registration request may be a new user registration request, a registration cancellation request, a registration update request, etc. The registration request may contain any suitable information. For example, the registration request may contain the UA 102's address (UA_add), such as a MAC (media access control) address, an IPv4 or IPv6 address or other suitable UA's address. Noted that the UA 102 may have multiple addresses, for example each address may be associated with a different user. In an embodiment, the UA 102's address may be included in the payload of the registration request, in the packet head (such as IP packet header) of the registration request or in any other suitable location of the registration request.

In an embodiment, the registration request may contain a personal voice registration command (PRC) raised by the user with the UA 102. For example, the UA 102 can include a voice user interface (UI) which can receive the user's voice and pre-process it (e.g., removing noise and encrypting it using a key unknown to other distrusted parties) via the voice UI.

When the RP 108 receives the registration request, it may forward it to the IdP 106. The forwarding operations of RP 108 will be described in detail hereinafter.

The apparatus 200 may further include a receiving element 204 configured to receiving from the IdP 108 at least one second challenge message with respective voice pattern code. The voice pattern codes can be provided in any suitable form, such as voice, text, image, audio or video. In an embodiment, the voice pattern codes can include letters, words, numbers, symbols, sentences or other suitable codes. In an embodiment, the pattern codes may comprise personal command pattern codes such as a login pattern code, a registration update pattern code, a registration deletion pattern code or other suitable pattern codes. In this embodiment, the at least one voice pattern code may be pronounced by the user in the light of the respective voice pattern code.

In an embodiment, the at least one second challenge message may further comprise respective second randomly generated challenge style. The randomly generated challenge style may comprise at least one of voice volume, pronunciation emphasis, pronunciation length, speaking speed and intervals among codes, as well as other pronunciation features. The randomly generated challenge style can be provided in any suitable form, such as voice, text, image, audio or video. As an example, a voice pattern code may be "A, B, C, D" and its corresponding randomly generated challenge style may comprise: "A" with loud voice volume, "B" with medium voice volume, "C" with low voice volume, "D" with low voice volume, the interval between "A" and "B" being 1s, the interval between "B" and "C" being 2s, and the interval between "C" and "D" being 1s. In other embodiments, the voice pattern code and its corresponding randomly generated challenge style may take any other suitable form. In this embodiment, the at least one voice pattern code may be pronounced by the user in the light of the respective voice pattern code and the respective second randomly generated challenge style.

The apparatus 200 may then provide the respective voice pattern code and respective second randomly generated challenge style (if any) to the user of the UA 102 for example via the voice UI or other suitable interface. The user may repeat the voice pattern code with his/her personal voice via the voice UI, and in other embodiment the user may repeat it in the light of the corresponding second randomly generated challenge style (if any). The sending element 202 may send at least one voice pattern code to the IdP 106, wherein the at least one voice pattern code is pronounced by the user in the light of the respective voice pattern code or is pronounced by the user in the light of the respective voice pattern code and the respective second randomly generated challenge style (if any). It is noted that the IdP 106 may randomly generate a series of voice pattern codes and challenge styles to challenge the UA 102 to provide its user's personal voice pattern codes one by one.

In an embodiment, the receiving element 204 may receive a registration result from the IdP 106 or the RP 108. The registration result may indicate to the user whether the registration is successful or any other suitable information such as failure reasons, etc. When the registration is failed, the user may launch another registration procedure. If the registration is successful, the user may initiate the authentication procedure subsequently or in the future in order to access the service provided by the RP 108 or perform other operations.

In the authentication procedure, the sending element 202 may send an authentication request to the RP 108, wherein the authentication request may comprises a voice authentication command which may be pronounced by the user of UA 102 or may be a recorded voice authentication command of the user. The authentication request may further contain any other suitable information. For example, the authentication request may contain the UA 102's address (UA_add), such as a MAC address, an IPv4 or IPv6 address or other suitable UA 102's address. Noted that the UA 102 may have multiple addresses, for example each address may be associated with a different user. In an embodiment, the UA 102's address may be included in the payload of the authentication request, in the packet head (such as IP packet header) of the authentication request or in any other suitable location of the authentication request.

The voice authentication command may be raised by the user with the UA 102. For example, as described above, the voice user interface (UI) can receive the user's voice and pre-process it (e.g., removing noise and encrypting it using a key unknown to other distrusted parties) as described above. The voice authentication command may be any suitable voice authentication command such as a login authentication command, a registration update authentication command or a registration deletion authentication command, etc.

The receiving element 204 may receive from the IdP 106 at least one first challenge message with respective randomly generated verification code and respective first randomly generated challenge style. The respective randomly generated verification code can be provided in any suitable form, such as voice, text, image, audio or video. In an embodiment, the randomly generated verification code can include letters, words, numbers, symbols, sentences or other suitable codes. In general, the randomly generated verification code may be randomly selected from the user's voice pattern codes which have been stored in the IdP 106 in the registration procedure.

In this embodiment, the respective first randomly generated challenge style may comprise at least one of voice volume, pronunciation emphasis, pronunciation length, speaking speed and intervals among codes, as well as other pronunciation features. The randomly generated challenge style can be provided in any suitable form, such as voice, text, image, audio or video. As an example, a randomly generated verification code may be "B, C, A, D" and its corresponding randomly generated challenge style may comprise: "B" with loud voice volume, "C" with medium voice volume, "A" with low voice volume, "D" with low voice volume, the interval between "B" and "C" being 1s, the interval between "C" and "A" being 2s, and the interval between "A" and "D" being 1s.

The apparatus 200 may then provide the respective randomly generated verification code and the respective first randomly generated challenge style to the user of the UA 102 for example via the voice UI or other suitable interface. The user may pronounce at least one voice verification code in the light of the respective randomly generated verification code and the respective first randomly generated challenge style via the voice UI. The sending element 202 may send the at least one voice verification code to the IdP 108. It is noted that the IdP 106 may randomly generate a series of randomly generated verification codes and corresponding first randomly generated challenge styles and challenges the UA 102 to provide its user's personal voice verification code one by one.

When the IdP 106 receives the at least one voice verification code from the UA 102, it may generate an authentication result. The generating operations of the IdP 106 will be described in detail hereinafter.

The receiving element 204 may receive the authentication result from the IdP 106 or the RP 108. The authentication result may indicate to the user whether the authentication is successful or any other suitable information such as failure reasons, etc. When the authentication is failed, the user may launch another authentication procedure. If the authentication is successful and the voice authentication command is a login authentication command, the user may access the service provided by the RP 108. When the voice authentication command is another authentication command such as a registration update authentication command, the UA 102 may be required to perform similar operations as described above in the registration procedure.

In various embodiments, the apparatus 200 may further comprise a connection establishing element 206 configured to establish security channels with the RP 108 and the IdP 106 respectively, for example by applying a secure communication protocol, e.g., SSL, OpenSSL, HTTPs, etc.

Figure 3:
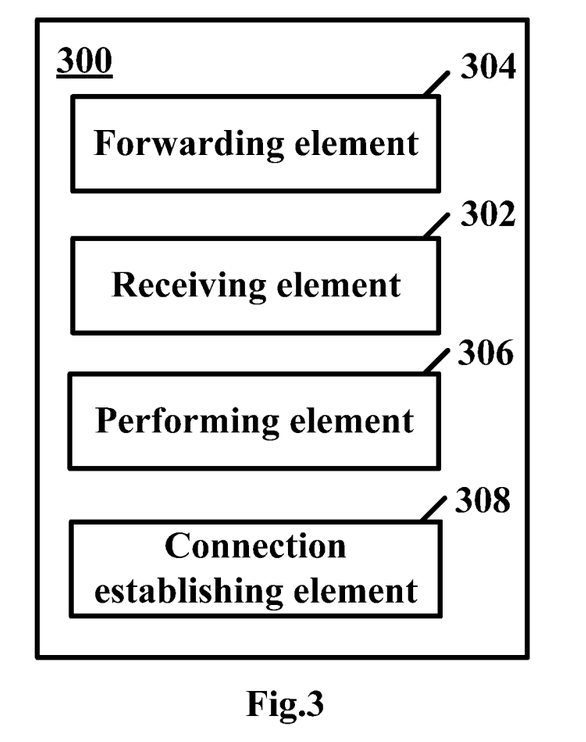
FIG. 3 shows a simplified block diagram of an apparatus for authentication in a system according to an embodiment of the present disclosure.

FIG. 3 shows a simplified block diagram of an apparatus 300 for authentication in a system according to an embodiment of the present disclosure. As described above, the system may comprise the components as described in FIG. 1. The apparatus 300 can be implemented as the RP 108 or a part of the RP 108 in FIG. 1. In the following, the operations performed by the apparatus 300 in the registration procedure will be described firstly, and then the operations performed by the apparatus 300 in the authentication procedure will be described. For some parts which have been described above with reference to FIG. 2, the description thereof is omitted herein for brevity.

With reference to FIG. 3 and FIG. 1, the apparatus 300 may include a receiving element 302 configured to receive from a user agent such as UA 102 a registration request. The registration request may contain any suitable information, for example, the registration request may contain the UA 102's address (UA_add), such as a MAC (media access control) address, an IPv4 or IPv6 address or other suitable UA's address, as described above.

In an embodiment, the registration request may contain a personal registration command (PRC) raised by the user with the UA 102, i.e. a voice registration command, as described above.

The apparatus 300 may further include a forwarding element 304 configured to forward the registration request to an identity provider such as IdP 106, wherein the forwarded registration request comprises the address of the UA 102 and a service identifier. For example, the RP 108 can provide various services to the user of UA 102, and each service has its service identifier RP_id. As an example, the RP 108 may be a cloud platform hosting two or more kinds of services. Moreover, the RP 108 may register its service(s) ahead of time at IdP 106 as RP_id(s). The address of the user agent may be obtained from the registration request received from the UA 102.

When the IdP 106 has completed the processing of the registration request, it may generate a registration result and send it to the RP 108. The receiving element 302 may receive the registration result from the IdP 106. The registration result may indicate whether the registration is successful or any other suitable information such as failure reasons, etc. In an embodiment, the forwarding element 304 may forward the registration result to the UA 102.

In an embodiment, the registration result may comprise a unique identifier UA_id for the user which is allocated by the IdP 106. If UA_id is not null, RP 108 may treat registration successful and keeps UA_id; otherwise, registration fails. As mentioned above, if the registration is failed, the user may launch another registration procedure, otherwise the user may initiate the authentication procedure subsequently or in the future in order to access the service provided by the RP 108 or perform other operations such as registration update or deletion, etc.

In the authentication procedure, the receiving element 302 may receive from the UA 102 an authentication request comprising a voice authentication command. For example, the voice authentication command may be pronounced by a user of UA 102. The authentication request may contain any suitable information as described above, such as the UA 102's address (UA_add). As described above, the voice authentication command may be any suitable voice authentication command, such as a login authentication command, a registration update authentication command or a registration deletion authentication command, etc. The RP 108 may recognize the voice authentication command by using any suitable voice recognition approach.

The forwarding element 304 may forward the authentication request to the IdP 106, wherein the forwarded authentication request may further comprises an address of the UA 102 and a service identifier. For example, RP 108 may obtain the UA 102's address from the payload of the authentication request or the packet head (such as IP packet header) of the authentication request or any other suitable location of the authentication request. The service identifier may be an identification number of a service provided by the RP 108 and to be accessed by the user of the UA 102. The service identifier may have been registered ahead of time at the IdP 106. It is noted that the RP 108 may provide more than one service. The address of the user agent and the service identifier may be placed in the header, payload or any other suitable location of the forwarded authentication request.

After the IdP 106 has received and processed the forwarded authentication request, it may generate authentication result and send it to the RP 108. The receiving element 302 may receive the authentication result from the IdP 106. The authentication result may indicate whether the authentication is successful or any other suitable information such as failure reasons, etc.

Then a performing element 306 of the apparatus 300 may perform one or more operations based on the authentication result. For example, if the authentication is successful and the recognized voice authentication command is a login authentication command, then the RP 108 may provide the service corresponding to the service identifier to the user of UA 102. Otherwise, it may refuse to provide the service. As another example, if the authentication is successful and the recognized voice authentication command is a registration deletion authentication command, then the RP 108 may delete the UA_id of the user. In addition, the apparatus 300 may send the authentication result to the UA 102.

In various embodiments, the apparatus 300 may further comprise a connection establishing element 308 configured to establish security channels with the UA 102 and the IdP 106 respectively, for example by applying a secure communication protocol, e.g., SSL, OpenSSL, HTTPs, etc.

Figure 4:
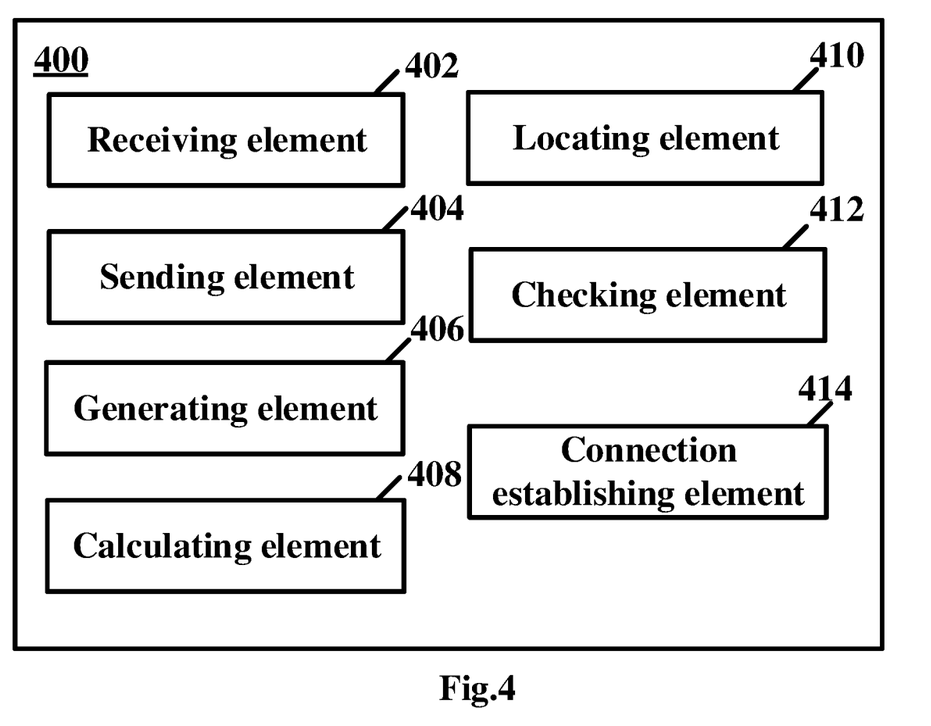
FIG. 4 shows a simplified block diagram of an apparatus for authentication in a system according to an embodiment of the present disclosure.

FIG. 4 shows a simplified block diagram of an apparatus 400 for authentication in a system according to an embodiment of the present disclosure. As described above, the system may comprise the components as described in FIG. 1. The apparatus 400 can be implemented as the IdP 106 or a part of the IdP 106 in FIG. 1. In the following, the operations performed by the apparatus 400 in the registration procedure will be described firstly, and then the operations performed by the apparatus 400 in the authentication procedure will be described. For some parts which have been described above with reference to FIGS. 2 and 3, the description thereof is omitted herein for brevity.

With reference to FIG. 4 and FIG. 1, as described above, in the registration procedure, the UA 102 may send a registration request to the RP 108 which may forward it to the IdP 106, wherein the forwarded registration request further comprises an address of the UA 102 and a service identifier. Then a receiving element 402 of the apparatus 400 may receive a registration request from the RP 108, wherein the registration request comprises the address of the UA 102 and a service identifier (RP_id) of RP 108. The RP_id of RP 108 may have been registered ahead of time at IdP 106. In an embodiment, the registration request may contain a personal registration command (PRC) raised by the user with the UA 102, as described above. The apparatus 400 may recognize the voice registration command through voice recognition. The apparatus 400 may generate a corresponding user profile with a unique identifier UA_id of the user that links to RP_id, wherein the UA_id may be allocated by the apparatus 400. In another embodiment, the UA_id may link to RP_id and the address of the UA 102.

Then the sending element 404 of the apparatus 400 may send to the UA 102 at least one second challenge message with respective voice pattern code. The voice pattern codes have been described above with reference to FIG. 2.

In an embodiment, the at least one second challenge message may further comprise respective second randomly generated challenge style. The randomly generated challenge style may comprise at least one of voice volume, pronunciation emphasis, pronunciation length, speaking speed and intervals among codes, as well as other pronunciation features. The randomly generated challenge style can be provided in any suitable form, such as voice, text, image, audio or video.

It is noted that the apparatus 400 may randomly generate a series of voice pattern codes and challenge styles to challenge the UA 102 to provide its user's personal voice pattern codes one by one.

As described above, when the UA 102 receives the at least one second challenge message, it may provide the respective voice pattern code and respective second randomly generated challenge style (if any) to the user of the UA 102 for example via the voice UI or other suitable interface. The user may repeat the voice pattern code with his/her personal voice via the voice UI in the light of the respective voice pattern code and respective second randomly generated challenge style (if any). The UA 102 may send at least one voice pattern code to the IdP 106. Then the receiving element 402 may receive the at least one voice pattern code from the UA 102.

If sufficient personal voice pattern codes of the user have been obtained, a generating element 406 of the apparatus 400 may generate the user's profile containing the voice patterns of the user based on the at least one voice pattern code, wherein the user's profile further contains UA_id and RP_id and the user's profile may be indexed by the UA_id. In another embodiment, the user's profile further contains the address of the UA 102. The voice patterns of the user can be applied to identify the user through voice.

In this embodiment, the generating element 406 may then generate a registration result and send the registration result to the RP 108 and/or the UA 102. The registration result may contain the address of UA 102, UA_id and RP_id if the user's profile can be created. If the user's profile cannot be created due to any suitable reasons, the registration result may contain the address of UA 102 and RP_id. When the RP 108 receive the registration result, it may check whether the registration result contains UA_id and treat registration successful and keeps UA_id if the UA_id is not null, otherwise, registration fails.

In an embodiment, the at least one second challenge message comprises respective second randomly generated challenge style, a calculating element 408 of the apparatus 400 may calculate the liveness of the at least one voice pattern code. For example, the liveness of a voice pattern code may be a deviation between the second randomly generated challenge style associated with the voice pattern code and the style of the voice pattern code. The lower the deviation is, the more possible the registered user is alive. If the deviation is below a predetermined threshold, the user may be deemed as alive, otherwise the IdP 106 may send to the UA 102 another second challenge message and challenges UA 102 again with another voice pattern code and randomly generated second challenge style. This procedure could be iterated for predetermined times in order to help IdP 106 make a correct registration decision.

In this embodiment, the generating element 406 may generate the registration result based on the liveness of the at least one voice pattern code. For example, if the user pass the liveness detection (for example, the deviation is below a predetermined threshold), then the user profile can be created and the registration result containing the address of UA 102, UA_id and RP_id may be sent to the RP 108. Otherwise, the user profile cannot be created and the registration result containing the address of UA 102 and RP_id may be sent to the RP 108. Liveness detection can ensure the user registration security.

In this embodiment, the second randomly generated challenge style may comprise at least one of voice volume, pronunciation emphasis, pronunciation length, speaking speed and intervals among codes, as well as other pronunciation features. The randomly generated challenge style can be provided in any suitable form, such as voice, text, image, audio or video.

When the user has successfully registered in the system, the user may initiate the authentication procedure subsequently or in the future in order to access the service provided by the RP 108 or perform other operations. For example, the UA 102 may send an authentication request to the RP 108, wherein the authentication request comprises a voice authentication command of a user of the UA 102, and the RP 108 may forward the authentication request to the IdP 106, wherein the forwarded authentication request further comprises an address of the UA 102 and a service identifier (RP-id) of the RP 108. Then the receiving element 402 may receive the authentication request from the RP 108, wherein the authentication request comprises the voice authentication command, the address of the UA 102 and the RP-id of the RP 108.

Then a locating element 410 of the apparatus 400 may locate the user's profile containing the voice patterns of the user based on the authentication request. For example, the apparatus 400 may extract the bio-information of the voice authentication command, retrieval the matched personal voice pattern code associated with a UA-id by using the bio-information, thereby finding the UA-id. In an embodiment, the apparatus 400 may use the UA-id and RP-id to locate the user profile. In another embodiment, the apparatus 400 may use the address of the UA 102, the UA-id and the RP-id to locate the user profile.

Then the sending element 402 may send to the UA 102 at least one first challenge message with respective randomly generated verification code and respective first randomly generated challenge style. The respective randomly generated verification code can be provided in any suitable form, such as voice, text, image, audio or video. In an embodiment, the randomly generated verification code can include letters, words, numbers, symbols, sentences or other suitable codes. In general, the randomly generated verification code may be randomly selected from the user's voice pattern codes which have been stored in the user profile in the registration procedure.

In this embodiment, the respective first randomly generated challenge style may comprise at least one of voice volume, pronunciation emphasis, pronunciation length, speaking speed and intervals among codes, as well as other pronunciation features. The randomly generated challenge style can be provided in any suitable form, such as voice, text, image, audio or video.

Then the receiving element 402 may receive at least one voice verification code from the UA 102. It is noted that the apparatus 400 may randomly generate a series of randomly generated verification codes and first randomly generated challenge styles and challenges the UA 102 to provide its user's personal voice verification code one by one.

Then a checking element 412 may check the validity of the at least one voice verification code. For example, the checking element 412 may check the validity of voice verification code by using a voiceprint recognition method, such as Dynamic Time Warping (DTW) and Mel Frequency Cepstral Coefficients (MFCC) technologies, wherein DTW has been described by Z. Hachkar, A. Farchi, B. Mounir and J. El Abbadi, "A Comparison of DHMM and DTW for Isolated Digits Recognition System of Arabic Language," International Journal on Computer Science and Engineering, vol. 3, no. 3, pp. 1002-1008, 2011, and MFCC has been described by J. F. Wang, G. M. Chang, J. C. Wang and S. C. Lin, "Stress Detection Based on Multi-class Probabilistic Support Vector Machines for Accented English Speech," in Proc. of CSIE, Los Angeles, Calif., pp. 346-350, 2009, which are incorporated herein by reference.

The calculating element 408 may calculate the liveness of the at least one voice verification code. For example, the liveness of a voice verification code comprises may be calculated as a deviation between a first randomly generated challenge style associated with the voice verification code and the style of the voice verification code. The lower the deviation is, the more possible the authenticated user is alive. If the deviation is below a predetermined threshold, the user may be deemed as alive, otherwise the IdP 106 may send to the UA 102 another first challenge message and challenges UA 102 again with another randomly generated verification code and another first randomly generated challenge style. This procedure could be iterated for predetermined times in order to help the apparatus 400 make a correct authentication decision.

The generating element 406 may generate an authentication result based on the validity and the liveness. For example, when the at least one voice verification code passes both the voice checking and the liveness detection (i.e., the validity is positive and the liveness is below a predetermined threshold), the user authentication is passed. The authentication result may contain any suitable information depending on the type of the voice authentication command for example. As an example, if the user authentication is passed and the voice authentication command is a login voice authentication command, the authentication result may contain the address of UA 102, UA_id and RP_id. If the user authentication is not passed, the authentication result may contain the address of UA 102 and RP_id. The sending element 404 may send the authentication result to the RP 108 or UA 102.

In various embodiments, the apparatus 400 may further comprise a connection establishing element 414 configured to establish security channels with the UA 102 and the RP 108 respectively, for example by applying a secure communication protocol, e.g., SSL, OpenSSL, HTTPs, etc.

Figure 5:
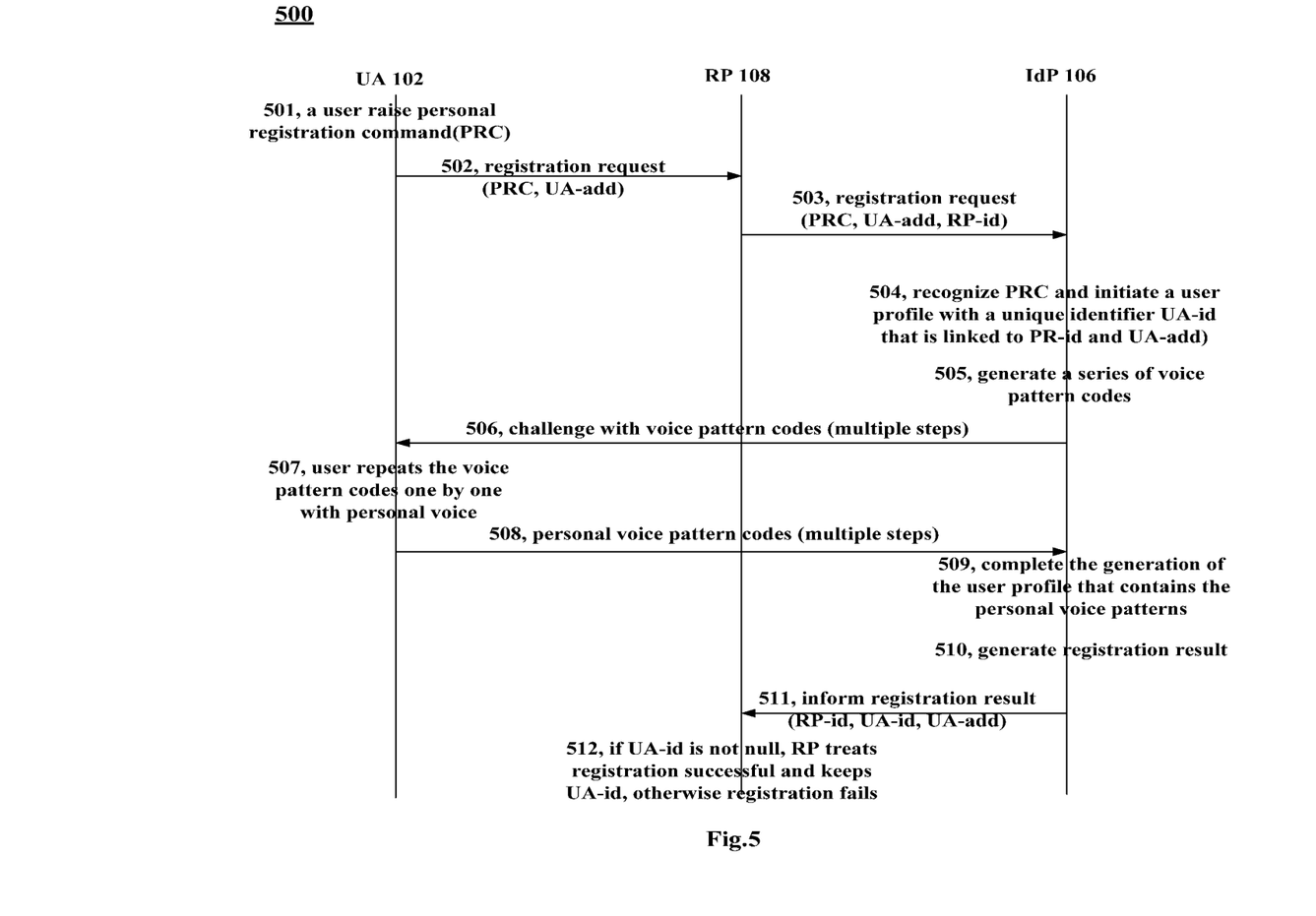
FIG. 5 is a flow chart showing a registration process in a system according to an embodiment of the present disclosure.

Under the same inventive concept, FIG. 5 is a flow chart showing a registration process 500 in a system according to an embodiment of the present disclosure. As described above, the system may comprise the components as described in FIG. 1. For same parts or functions as described in the previous embodiments, the description thereof is omitted for brevity.

As shown in FIG. 5, the process 500 may begin with a step 501. At 501, a user of UA 102 may raise personal registration command (PRC) when the user wants to access a service provided by the RP 108.

At 502, UA 102 requests registration into RP 108 service (RP_id) by sending a registration request containing the PRC and UA's address (UA_add) to RP 108.

At 503, RP 108 forwards this request to IdP 106 by sending a package that contains (RP_id, UA_add, PRC).

At 504, IdP 106 recognizes PRC and generates a corresponding user profile with a unique identifier UA_id that links to RP_id and UA_add. In another embodiment, UA-id may be linked to PR-id.

At 505, IdP 106 may generate a series of voice pattern codes to challenge UA 102. In another embodiment, the voice pattern codes may have respective second randomly generated challenge style.

At 506, IdP 106 may send to UA 102 at least one second challenge message with respective voice pattern code and respective second randomly generated challenge style (if required).

At 507, the user may repeat at least one voice pattern code with personal voice in the light of respective voice pattern code and respective second randomly generated challenge style (if any).

At 508, UA 102 may send at least one voice pattern code to IdP 106, wherein the at least one voice pattern code is pronounced by the user in the light of the respective voice pattern code and respective second randomly generated challenge style (if any).

At 509, IdP 106 completes the generation of the user profile that contains the personal voice patterns if it gets sufficient personal voice pattern codes and the at least one voice pattern code passes the liveness detection (if required).

At 510, IdP 106 generates a registration result and sends it to RP 108 at 511.

At 512, if UA-id is not null, RP 108 treats registration successful and keeps UA-id, otherwise registration fails.

It is noted that the above communication between any two parties may be over security channels, e.g., SSL, OpenSSL, HTTPs, etc.

Figure 6:
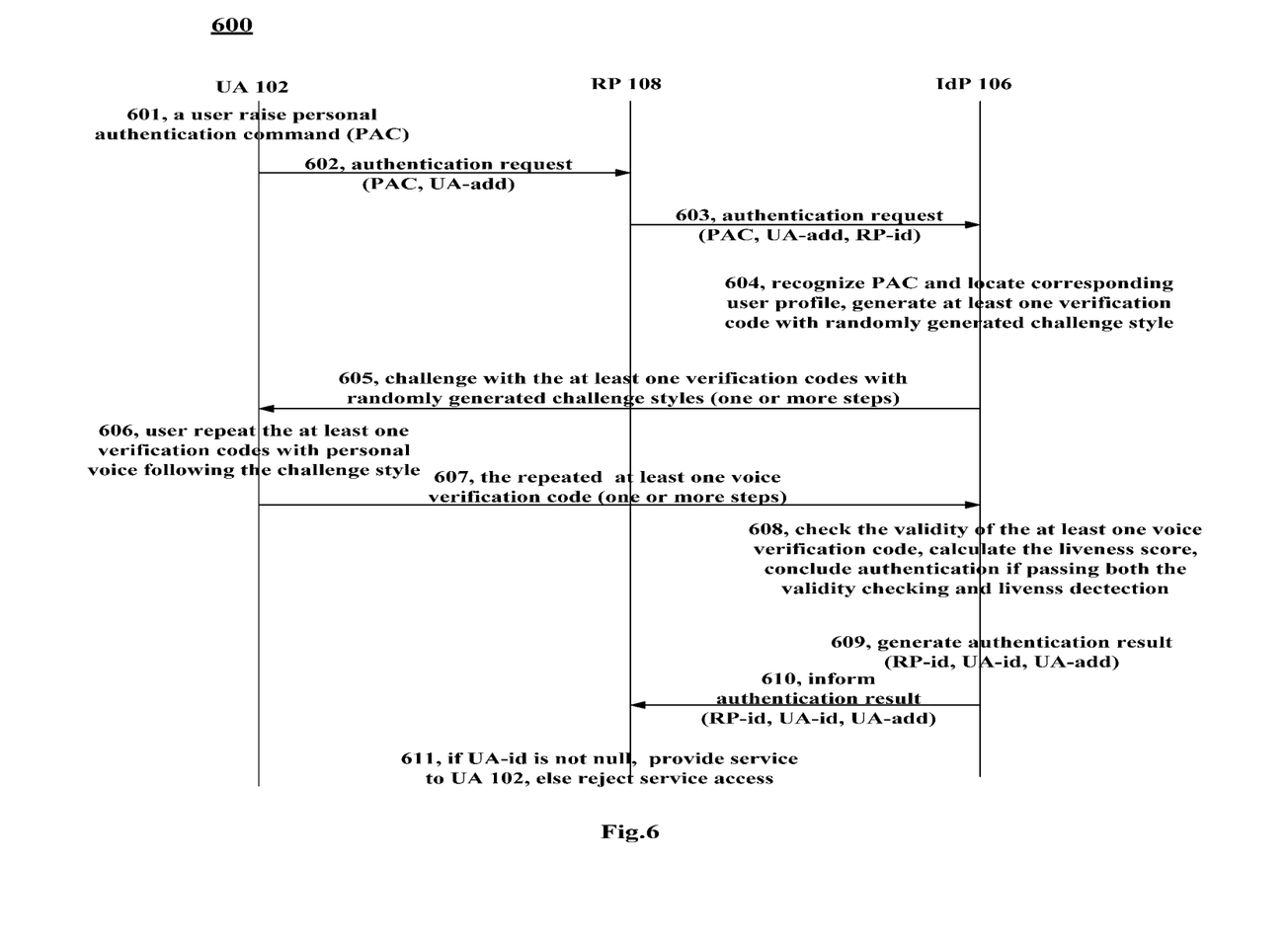
FIG. 6 is a flow chart showing an authentication process in a system according to an embodiment of the present disclosure.

Under the same inventive concept, FIG. 6 is a flow chart showing an authentication process 600 in a system according to an embodiment of the present disclosure. As described above, the system may comprise the components as described in FIG. 1. For same parts or functions as described in the previous embodiments, the description thereof is omitted for brevity.

As shown in FIG. 6, the process 600 may begin with a step 601. At 601, a user of UA 102 may raise personal authentication command (PAC) when the user wants to access the service provided by the RP 108 or perform other operations.

At 602, UA 102 may send an authentication request to RP 108, which may comprise the PAC and UA 102's address (UA_add).

At 603, RP 108 forwards this request to IdP 106 by sending a package that contains (PAC, UA_add, RP_id).

At 604, IdP 106 recognizes PAC and locate corresponding user profile, generate one or more verification codes with randomly generated challenge styles At 605, IdP 106 sends to UA 102 at least one first challenge message with respective randomly generated verification code and respective randomly generated challenge style.

At 606, the user may repeat the at least one verification codes with personal voice following the challenge style.

At 607, UA 102 may send the repeated one or more voice verification code to IdP 106.

At 608, IdP 106 may check the validity of the at least one voice verification code, calculate the liveness score, conclude authentication if passing both the validity checking and liveness detection.

At 609, IdP 106 generates an authentication result and sends it to RP 108 at 610. In addition, the IdP 106 may perform one or more operations in the light of the PAC.

At 611, if UA-id is not null, RP 108 treats authentication successful and perform one or more operations in the light of the PAC, otherwise authentication fails.

It is noted that the above communication between any two parties may be over security channels, e.g., SSL, OpenSSL, HTTPs, etc.

It is noted that any of the components of the apparatus 200, 300, 400 depicted in FIG. 2-4 can be implemented as hardware or software modules. In the case of software modules, they can be embodied on a tangible computer-readable recordable storage medium. All of the software modules (or any subset thereof) can be on the same medium, or each can be on a different medium, for example. The software modules can run, for example, on a hardware processor. The method steps can then be carried out using the distinct software modules, as described above, executing on a hardware processor.

According to an aspect of the disclosure it is provided an apparatus for authentication. Said apparatus comprises means configured to send an authentication request to a relying party, wherein the authentication request comprises a voice authentication command of a user; means configured to receive from an identity provider at least one first challenge message with respective randomly generated verification code and respective first randomly generated challenge style; and means configured to send at least one voice verification code to the identity provider, wherein the at least one voice verification code is pronounced by the user in the light of the respective randomly generated verification code and the respective first randomly generated challenge style.

In an embodiment, the apparatus further comprises: means configured to send a registration request to the relying party; means configured to receive from the identity provider at least one second challenge message with respective voice pattern code; and means configured to send at least one voice pattern code to the identity provider, wherein the at least one voice pattern code is pronounced by the user in the light of the respective voice pattern code.

In an embodiment, the at least one second challenge message further comprises respective second randomly generated challenge style, and the at least one voice pattern code is pronounced by the user in the light of the respective voice pattern code and the respective second randomly generated challenge style.

In an embodiment, the registration request comprises a voice registration command.

In an embodiment, the randomly generated challenge style comprises at least one of voice volume, pronunciation emphasis, pronunciation length, speaking speed and intervals among codes.

In an embodiment, the apparatus further comprises: means configured to establish security channels with the relying party and the identity provider respectively.

According to another aspect of the disclosure it is provided an apparatus for authentication. Said apparatus comprises means configured to receive from a user agent an authentication request comprising a voice authentication command; means configured to forward the authentication request to an identity provider, wherein the forwarded authentication request further comprises an address of the user agent and a service identifier; and means configured to receive an authentication result from the identity provider; means configured to perform one or more operations based on the authentication result.

In an embodiment, the apparatus further comprises: means configured to receive from the user agent a registration request; means configured to forward the registration request to the identity provider, wherein the forwarded registration request comprises the address of the user agent and the service identifier; means configured to receive a registration result from the identity provider.

In an embodiment, the registration request further comprises a voice registration command.

In an embodiment, the apparatus further comprises means configured to establish security channels with the user agent and the identity provider respectively.

According to another aspect of the disclosure it is provided an apparatus for authentication. Said apparatus comprises means configured to receive an authentication request from a relying party, wherein the authentication request comprises a voice authentication command, an address of a user agent and a service identifier; means configured to locate a user's profile containing the voice patterns of the user based on the authentication request; means configured to send to the user agent at least one first challenge message with respective randomly generated verification code and respective first randomly generated challenge style; and means configured to receive from the user agent at least one voice verification code; means configured to check the validity of the at least one voice verification code; means configured to calculate the liveness of the at least one voice verification code; means configured to generate an authentication result based on the validity and the liveness; and means configured to send the authentication result.

In an embodiment, said apparatus further comprises means configured to check the validity of the at least one voice verification code comprises checking the validity of the at least one voice verification code by using a voiceprint recognition approach.

In an embodiment, said apparatus further comprises means configured to calculate the liveness of a voice verification code comprises calculating a deviation between a first randomly generated challenge style associated with the voice verification code and the style of the voice verification code.

In an embodiment, the apparatus further comprises means configured to receive a registration request from the relying party, wherein the registration request comprises the address of the user agent and the service identifier; means configured to send to the user agent at least one second challenge message with respective voice pattern code; means configured to receive from the user agent at least one voice pattern code; means configured to generate the user's profile containing the voice patterns of the user based on the at least one voice pattern code, wherein the user's profile further contains a unique identifier of the user and the service identifier; means configured to generate a registration result; and means configured to send the registration result.

In an embodiment, the at least one second challenge message further comprises respective second randomly generated challenge style, and the apparatus further comprises: means configured to calculate the liveness of the at least one voice pattern code; and means configured to generate the registration result based on the liveness of the at least one voice pattern code.

In an embodiment, said apparatus further comprises means configured to calculate the liveness of a voice pattern code comprises calculating a deviation between the second randomly generated challenge style associated with the voice pattern code and the style of the voice pattern code.

In an embodiment, the registration request comprises a voice registration command.

In an embodiment, the user's profile further contains the address of the user agent.

In an embodiment, the randomly generated challenge style comprises at least one of voice volume, pronunciation emphasis, pronunciation length, speaking speed and intervals among codes.

In an embodiment, the apparatus further comprises means configured to establish security channels with the relying party and the user agent respectively.

Additionally, an aspect of the disclosure can make use of software running on a computing device. Such an implementation might employ, for example, a processor, a memory, and an input/output interface formed, for example, by a display and a keyboard. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. The processor, memory, and input/output interface such as display and keyboard can be interconnected, for example, via bus as part of a data processing unit. Suitable interconnections, for example via bus, can also be provided to a network interface, such as a network card, which can be provided to interface with a computer network, and to a media interface, such as a diskette or CD-ROM drive, which can be provided to interface with media.

Accordingly, computer software including instructions or code for performing the methodologies of the disclosure, as described herein, may be stored in associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

As noted, aspects of the disclosure may take the form of a computer program product embodied in a computer readable medium having computer readable program code embodied thereon. Also, any combination of computer readable media may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that may contain, or store a program for use by or in connection with an instruction execution system, apparatus, or device.

Computer program code for carrying out operations for aspects of the disclosure may be written in any combination of at least one programming language, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server.

The authentication solution described in the present disclosure has the following advantages:

Usability: the authentication solution of the disclosure is based on a challenge-response structure. The users only need to respond the challenge without remembering any credentials. Thus, the authentication solution allows the users to easy follow the system procedure. It is suitable for special user groups, such as children and elder people and very convenient to be applied when the users are doing something else, e.g., driving.

Low cost: the authentication solution of the disclosure does not need extra specific device to support. Compared to the previous methods needing additional equipment to detect liveness, such as special sensor or camera, the proposed authentication solution only needs a microphone to support.

Security: the proposed authentication solution can do the authentication and the liveness detection at the same time, which improves the system security. If the authentication and liveness detection are separately, intruders might spoof the system one by one, which increases system risk.

Advanced user experience: the proposed authentication solution can detect liveness at anywhere and anytime without any manual input. Compared to the method based on pupil dynamics for iris recognition, the proposed authentication solution would not bring any discomfort to users. The proposed authentication solution also has a low computation and processing cost, compared with the Oder analysis method for fingerprint recognition.

The flowchart and block diagrams in the figures illustrate the architecture, functionality, and operation of possible implementations of systems, methods and computer program products according to various embodiments of the disclosure. In this regard, each block in the flowchart or block diagrams may represent a module, component, segment, or portion of code, which comprises at least one executable instruction for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In any case, it should be understood that the components illustrated in this disclosure may be implemented in various forms of hardware, software, or combinations thereof, for example, application specific integrated circuit(s) (ASICS), functional circuitry, an appropriately programmed general purpose digital computer with associated memory, and the like. Given the teachings of the disclosure provided herein, one of ordinary skill in the related art will be able to contemplate other implementations of the components of the disclosure.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. It will be further understood that the terms "comprises", "containing" and/or "comprising," when used in this specification, specify the presence of stated features, integers, steps, operations, elements, and/or components, but do not preclude the presence or addition of another feature, integer, step, operation, element, component, and/or group thereof.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

What is claimed is:

1. An apparatus comprising:
   at least one processor,
   at least one memory including computer program code,
   the at least one memory and the computer program code configured to, with the at least one processor, cause the apparatus to:
   send an authentication request to a relying party, wherein the authentication request comprises a voice authentication command of a user;
   receive from an identity provider at least one first challenge message with respective randomly generated verification code and respective first randomly generated challenge style, wherein the first randomly generated challenge style comprises at least one of voice volume, pronunciation emphasis, pronunciation length, speaking speed and intervals among codes; and send at least one voice verification code to the identity provider, wherein the at least one voice verification code is pronounced by the user based on the respective randomly generated verification code and the respective first randomly generated challenge style.

2. The apparatus according to claim 1, further caused to:
send a registration request to the relying party;
receive from the identity provider at least one second challenge message with respective voice pattern code; and
send at least one voice pattern code to the identity provider, wherein the at least one voice pattern code is pronounced by the user based on the respective voice pattern code.

3. The apparatus according to claim 2, wherein the at least one second challenge message further comprises respective second randomly generated challenge style, and the at least one voice pattern code is pronounced by the user based on the respective voice pattern code and the respective second randomly generated challenge style.

4. The apparatus according to claim 3, wherein the registration request comprises a voice registration command.

5. The apparatus according to claim 1, further caused to establish security channels with the relying party and the identity provider respectively.

6. An apparatus comprising:
at least one processor,
at least one memory including computer program code,
the at least one memory and the computer program code being configured to, with the at least one processor, cause the apparatus to:
receive from a user agent an authentication request comprising a voice authentication command;
forward the authentication request to an identity provider, wherein the forwarded authentication request further comprises an address of the user agent and a service identifier, so that the identity provider will send to the user agent at least one first challenge message with respective randomly generated verification code and respective first randomly generated challenge style, wherein the first randomly generated challenge style comprises at least one of voice volume, pronunciation emphasis, pronunciation length, speaking speed and intervals among codes;
receive an authentication result from the identity provider, wherein the authentication result is based on at least one voice verification code sent to the identity provider from the user agent, wherein the at least one voice verification code was pronounced by a user based on the respective randomly generated verification code and the respective first randomly generated challenge style; and
perform one or more operations based on the authentication result.

7. The apparatus according to claim 6, further being caused to:
receive from the user agent a registration request;
forward the registration request to the identity provider, wherein the forwarded registration request comprises the address of the user agent and the service identifier;
receive a registration result from the identity provider.

8. The apparatus according to claim 7, wherein the registration request further comprises a voice registration command.

9. The apparatus according to claim 6, further being caused to establish security channels with the user agent and the identity provider respectively.

10. An apparatus comprising:
at least one processor,
at least one memory including computer program code,
the at least one memory and the computer program code configured to, with the at least one processor, cause the apparatus to:
receive an authentication request from a relying party, wherein the authentication request comprises a voice authentication command, an address of a user agent and a service identifier;
locate a user's profile containing the voice patterns of the user based on the authentication request;
send to the user agent at least one first challenge message with respective randomly generated verification code and respective first randomly generated challenge style, wherein the first randomly generated challenge style comprises at least one of voice volume, pronunciation emphasis, pronunciation length, speaking speed and intervals among codes;
receive from the user agent at least one voice verification code;
check the validity of the at least one voice verification code;
calculate the liveness of the at least one voice verification code;
generate an authentication result based on the validity and the liveness; and
send the authentication result.

11. The apparatus according to claim 10, further caused to check the validity of the at least one voice verification code by using a voiceprint recognition approach.

12. The apparatus according to claim 10, further caused to calculate a deviation between a first randomly generated challenge style associated with the voice verification code and the style of the voice verification code.

13. The apparatus according to claim 10, further caused to:
receive a registration request from the relying party, wherein the registration request comprises the address of the user agent and the service identifier;
send to the user agent at least one second challenge message with respective voice pattern code;
receive from the user agent at least one voice pattern code;
generate the user's profile containing the voice patterns of the user based on the at least one voice pattern code, wherein the user's profile further contains a unique identifier of the user and the service identifier;
generate a registration result; and
send the registration result.

14. The apparatus according to claim 13, wherein the at least one second challenge message further comprises respective second randomly generated challenge style, and the apparatus further caused to:
calculate the liveness of the at least one voice pattern code; and
generate the registration result based on the liveness of the at least one voice pattern code.

15. The apparatus according to claim 14, further caused to calculate a deviation between the second randomly generated challenge style associated with the voice pattern code and the style of the voice pattern code.

16. The apparatus according to claim 13, wherein the registration request comprises a voice registration command.

17. The apparatus according to claim 13, wherein the user's profile contains the address of the user agent.

18. The apparatus according to claim 10, further caused to establish security channels with the relying party and the user agent respectively.

\* \* \* \* \*